Oct. 25, 1927.  
B. SKIDMORE, JR  
1,646,427  
FLEXIBLE COUPLING  
Filed Feb. 11, 1925  
2 Sheets-Sheet 2

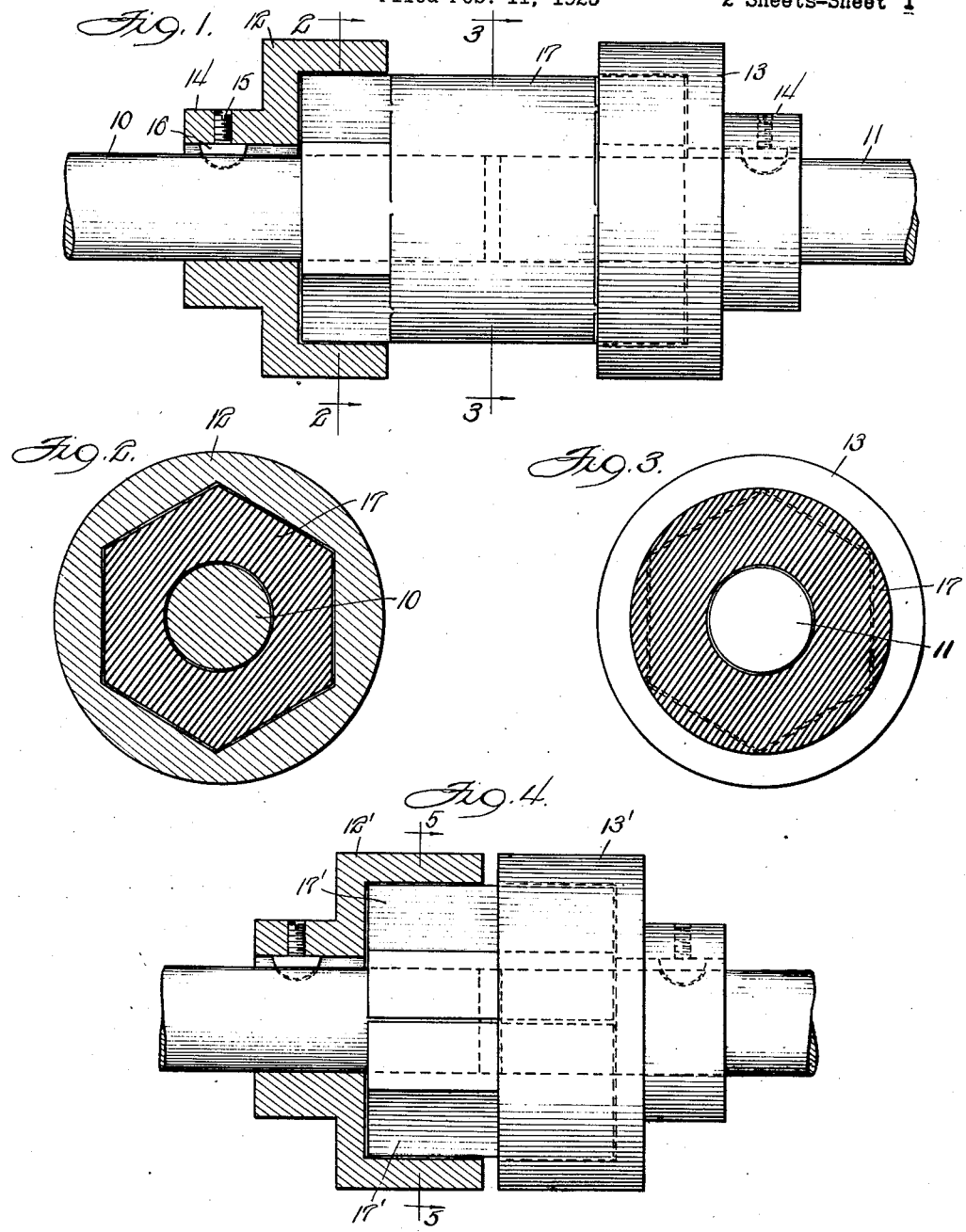

Inventor:  
BENJAMIN SKIDMORE JR.  
By Williams, Bradbury,  
McCaleb & Hinkle Att'ys.

Witness:  
W. K. Olson

Patented Oct. 25, 1927.

1,646,427

UNITED STATES PATENT OFFICE.

BENJAMIN SKIDMORE, JR., OF CHICAGO, ILLINOIS.

FLEXIBLE COUPLING.

Application filed February 11, 1925. Serial No. 8,320.

This invention relates to flexible couplings for interconnecting the ends of aligned or approximately aligned shafts.

This application is a continuation in part of application Serial No. 694,275, filed February 21, 1924.

In practice, perfect alignment between driving and driven shafts is often commercially impossible to obtain and maintain. Even slight misalignment, especially at the higher speeds, causes excessive wear of bearings, noise and loss of power if the shafts are rigidly interconnected.

Many different types of flexible couplings have been devised and used to interconnect shafts and overcome the objectionable results of their misalignment. Such couplings have been more or less complicated and usually have an excessive number of parts. Many are noisy. Some depend upon friction alone to transmit the power from one shaft to the other, and, unless compensation is made for wear, slippage is apt to occur. Some employ a metallic spring or springs to transmit the power, but such couplings, when properly made, are relatively expensive. Metallic springs are also objectionable because they are subject to crystallization and corrosion in service.

One of the objects of this invention is to provide an improved flexible coupling.

Another object is to provide a coupling which does not depend upon friction for communicating power between shafts.

Another object is to provide a flexible coupling which is quiet in operation.

Another object is to provide a flexible coupling which does not employ metallic springs.

Another object is to provide a flexible coupling which is simple and reliable.

Another object is to provide a flexible coupling which may be readily manufactured, installed and removed.

Another object is to provide an improved coupling which will serve as a cushion and protection against sudden acceleration and overload.

Another object is to provide an improved coupling which will serve to protect shafts and machinery against injuries resulting from sudden stoppage.

Another object is to provide an improved "shearing" coupling.

Another object is to prevent excessive distortion of the elastic element through which the power is transmitted between the shafts.

Other objects and advantages will hereinafter appear.

Embodiments of the invention are illustrated in the accompanying drawings, wherein—

Fig. 1 is a side elevation and partial section of one form of the improved coupling wherein the driving faces form a hexagon;

Fig. 2 is a section on the line 2—2 of Fig. 1;

Fig. 3 is a section on the line 3—3 of Fig. 1;

Fig. 4 is a side elevation and partial section of a modified coupling;

Figure 5:
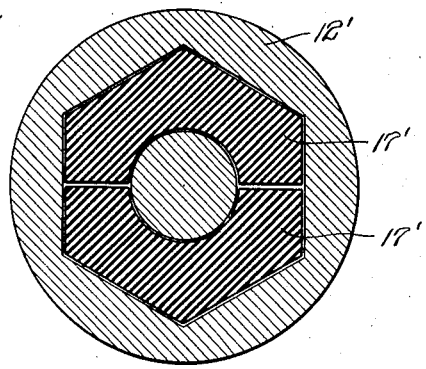
Fig. 5 is a section on the line 5—5 of Fig. 4.

Figs. 1 to 3 will first be described.

Two shafts 10 and 11, either of which may be considered the driving shaft, are shown in substantially axial alignment. These shafts have metallic cup-shaped coupling members 12 and 13 secured thereto, respectively. Coupling members 12 and 13 are similar in construction and may be secured to their respective shafts in various ways. One method of attachment is to provide each member with an auxiliary projecting boss 14 which has a central bore through which the respective shaft may pass and a threaded hole for receiving a set screw 15. Set screw 15 may directly engage the corresponding shaft, or, as shown in the drawings, may engage a spline 16 positioned in suitable keyways in the surface of the shaft and in the bore of the boss. The recess in the face of each coupling member is so shaped that, to a greater or less extent, its enclosing side wall deviates from an inscribed circle about the axis of rotation. The side wall of the recess thus provides one or more driving faces, each of which is eccentric to the axis of rotation. One specific shape of recess which will provide the desired driving faces is a hexagon as shown most clearly in Figs. 2 and 3.

Extending axially between the two coupling members 12 and 13 and seated at opposite ends within the recesses in the adjacent faces thereof is a relatively soft, elastic interconnecting element 17. Although element 17 may be solid, it is preferred that it have an axial bore therethrough to increase its flexibility and for receiving the ends of shafts 10 and 11, if the same should project beyond the adjacent faces of the coupling members. The opposite ends of element 17 are preferably formed to approximately fit within and conform to the shape of the recesses in the coupling members 12 and 13, so that they will have driving faces to register with the driving faces of the coupling members. Between the ends thus formed, the shape of interconnecting element 17 is not of particular importance. It may be of hexagonal or other shape to conform to the ends, although it has been found expedient in most instances to have the intermediate section of element 17 substantially cylindrical.

Interconnecting element 17 may be made of suitable relatively soft, elastic material, such, for example, as rather firm rubber or a composition of rubber and fabric. Its softness and elasticity will depend upon, and may be varied according to, the character of the service and the amount of flexibility and resiliency desired or permissible between the driving and driven shafts.

The coupling, consisting essentially of only three elements, may be readily applied by slipping the two coupling members 12 and 13 upon the respective ends of the two shafts to be interconnected. The elastic interconnecting element is then slipped over or between the ends of the shafts and the two coupling members are moved toward each other and secured to their shafts in such positions that the ends of the interconnecting element cannot withdraw, or be withdrawn from, the recesses. The interconnecting element is not attached to the collars. In this condition the recesses in the confronting faces of the axially separated coupling members form sockets for the opposite ends of the interconnecting element and driving faces of the coupling members register with the corresponding driving faces at the ends of the interconnecting element to transmit motion and power therebetween by a direct pressure or push. Friction does not play any part in the transmission of motion or power because the driving faces are not relatively concentric to the axis of rotation and therefore there is no sliding tendency between them.

The transmission of motion and power between the two coupling members is due solely to the resistance which the interconnecting element offers to being twisted, that is, to torsion alone. Consequently the flexibility and cushioning effect of the coupling does not depend entirely upon the compressible elasticity of the soft interconnecting element, but to a greater or lesser extent governed by its length and composition, and its torsional elasticity.

The pressure between the driving faces of the coupling members and the corresponding ends of the interconnecting element, particularly if the power transmitted is relatively large, may tend to distort the interconnecting element toward its center and, by causing a contraction of the bore therethrough, diminish the external size of the ends of the interconnecting element. Such distortion will tend to lessen the areas of contact between the cooperating driving faces on the coupling members and interconnecting element. By making the bore through the interconnecting element of such a size that it more or less closely fits about the projecting ends of the two shafts, the rigid shaft ends within the bore will serve to reinforce the interconnecting element and to retain the same in its original size and shape.

Figs. 4 and 5 illustrate a modified coupling which is particularly adapted for application to shafts whose ends are relatively close together and which cannot be readily separated. Under such conditions of installation it might be difficult, if not impossible, to position the interconnecting element over the ends of the shafts if the element is in a single piece. To overcome this difficulty in such situations, the interconnecting element may be split longitudinally or formed into sections. In Figs. 4 and 5, the interconnecting element is illustrated as formed of two similar sections 17'. These two sections may be separately applied to the shaft ends. When the two cup-shaped coupling members 12' and 13' are brought toward each other and the opposite ends of the element sections are fitted within the recesses or sockets in the opposite faces thereof, the two sections of the interconnecting element will be held firmly in position and will serve, in effect, as one element precisely as described in connection with Figs. 1 to 3.

Figure 6:
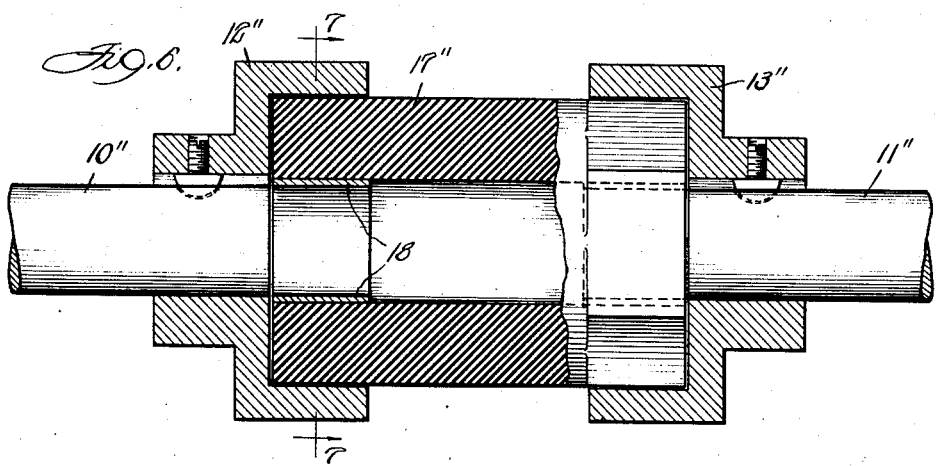
Fig. 6 is a side elevation and partial section of another modified form of coupling.
Figure 7:
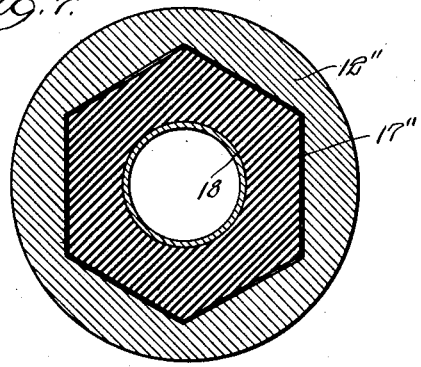
Fig. 7 is a section on the line 7—7 of Fig. 6.

Figs. 6 and 7 show a modified coupling wherein the interconnecting element includes reinforcement for preventing its excessive distortion under relatively heavy loads. It sometimes happens that the ends of the shafts cannot be depended upon to properly provide the desired reinforcement. This condition may obtain where the ends of the shafts do not project into the interconnecting element, where there is considerable difference in the sizes of the two shafts or where the size of both shafts is considerably less than the size of the bore through the interconnecting element. In Figs. 6 and 7 the two shafts 10" and 11" are shown extending into the corresponding collars 12" and 13" only about to the bottoms of the sockets therein. The reinforcement is provided by fitting a thin-walled ring or sleeve 18 into each end of the bore of interconnecting element 17″. Good results will be obtained by making the length of each ring or sleeve approximately equal to the length of the corresponding non-circular driving end of the interconnecting element. These reinforcing rings or sleeves may be made of metal, fibre, or other suitable rigid material and serve to reinforce the relatively soft and elastic material and prevent contraction of the bore when the coupling is subjected to heavy loads. Thus the continuance of the proper interlocking driving relation between the registering faces or surfaces of the coupling members and interconnecting element are insured, but the flexibility of the coupling is not impaired.

Figure 8:
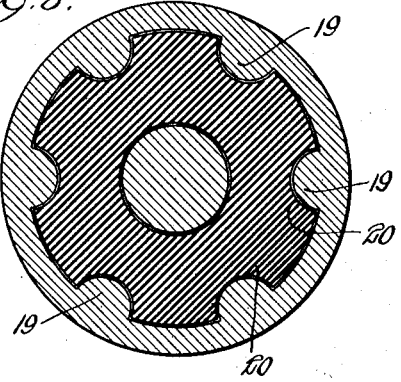
Fig. 8 is a section taken on a line similar to Fig. 2, showing a modified form of the interlocking driving faces.

Fig. 8 shows one of many modified forms for the sockets in the coupling members and for the registering ends of the interconnecting element. The driving faces in the collar sockets are formed by providing their side walls with a series of longitudinally extending ribs 19. The driving faces at the ends of the interconnecting element are formed by providing longitudinally extending flutes or grooves 20, in which ribs 19 lie. This manner of providing the driving faces produces a type of interconnecting element which is relatively resistant against distortion within the coupling member because at the periphery, where distortion is ordinarily most apt to occur, the material between driving faces is relatively wide.

The improved coupling will serve to interconnect shafts which are somewhat out of alignment and will lessen or overcome the objectionable results which ordinarily flow from such misalignment. The relatively soft and elastic material of which the interconnecting element is formed causes that element to serve as a compressible and torsional cushion between the shafts when the driving shaft is suddenly accelerated or the driven shaft is suddenly subjected to load. The degree of flexibility and torsional cushioning effect may be varied by changing the length of the interconnecting element, the longer the element the greater being its flexibility and torsional cushioning action. If one of the shafts should suddenly stop, because of some accident or other abnormal condition, the soft interconnecting element may be relatively easily sheared by the driving faces of the connecting members cutting the same down to an approximate cylinder and both the shafts and the machinery connected thereto will be protected against breakage or other injury. When, under such conditions, the interconnecting element is destroyed, it may be replaced at relatively little expense. The coupling is well adapted to situations where it is desired to insulate the two shafts from each other because the interconnecting element may be made of rubber or rubber composition which possesses good insulating properties.

I claim—

1. A flexible coupling for interconnecting two shafts in substantial alignment and comprising, a pair of cup-shaped coupling members adapted to be connected to the shafts and having non-circular recesses in their adjacent faces, and a relatively soft and elastic interconnecting element having its opposite ends formed to substantially fit the recesses in the coupling members and serving to communicate motion and power therebetween by torsion alone, said interconnecting element and coupling members being so related that the coupling members will shear the ends of the interconnecting element into approximately cylindrical form in the event that the power to be transmitted becomes excessive.

2. In a flexible coupling the combination of a pair of coupling members, each having a bore therethrough; a relatively soft elastic interconnecting element adapted to be interposed between said members, said members and element having cooperating driving faces for communicating motion therebetween; and means for reinforcing said element to restrain the deformation of its driving faces.

3. A flexible coupling for interconnecting approximately aligned shafts and comprising, a pair of coupling members adapted to be secured to the shafts, each said member having a non-circular driving face; a relatively soft elastic interconnecting element adapted to be interposed between said members and having driving faces cooperating with the driving faces of said members; and a rigid ring located in each end of said element to prevent its excessive distortion when under load.

4. A flexible coupling formed of relatively soft resilient material and designed for interconnecting two shafts which are in substantial alignment, said shafts being provided with means affording at least one coupling engaging and driving surface, and said coupling having a complementary formation, whereby it is adapted to engage the shafts, the complementary surfaces alone serving to maintain the coupling in association with said shafts and to prevent slippage between said coupling and said shafts, and motion being transferred from one shaft to another by torsion alone.

5. A flexible coupling designed to connect two shafts in substantial alignment, said flexible coupling comprising a section of live rubber of substantially cylindrical form having its ends shaped to provide driving faces, and having a metal ring insert at each end thereof, the coupling being joined to the shafts by a pair of oppositely faced recessed coupling members secured to the shafts, and having faces in the recesses therein adapted to engage the driving faces on the flexible coupling.

6. A flexible coupling formed of relatively soft, resilient material and designed for inter-connecting two shafts which are in substantial alignment, each shaft being provided with means affording at least one coupling engaging and driving surface and said coupling having a complementary formation whereby it is adapted to engage the shafts and transmit motion therebetween by torsion alone, the complementary surfaces alone serving to transmit power between the coupling and shafts and to prevent slippage therebetween, and means for preventing excessive deformation at the ends of said coupling in the region in which it is in engagement with said shafts.

In witness whereof, I hereunto subscribe my name this 6th day of February, 1925.

BENJAMIN SKIDMORE, Jr.